(12) United States Patent
Gustavsson

(10) Patent No.: US 7,934,358 B2
(45) Date of Patent: May 3, 2011

(54) METHOD FOR PRODUCING A READY-TO-DISTRIBUTE DISTRIBUTION ASSEMBLY COMPRISING A DATA CARRIER

(75) Inventor: Peter Gustavsson, Stockholm (SE)

(73) Assignee: Expericard AB, Stockholm (SE)

( * ) Notice: Subject to any disclaimer, the term of this patent is extended or adjusted under 35 U.S.C. 154(b) by 91 days.

(21) Appl. No.: 12/131,719

(22) Filed: Jun. 2, 2008

(65) Prior Publication Data

US 2009/0199516 A1   Aug. 13, 2009

(30) Foreign Application Priority Data

Feb. 11, 2008   (SE) ..................................... 0800306

(51) Int. Cl.
 *B65B 61/02* (2006.01)
(52) U.S. Cl. ............... 53/411; 53/460; 53/131.2; 53/53; 53/54; 53/55; 53/65
(58) Field of Classification Search ................ 53/53–57, 53/411, 445, 460, 254, 131.2, 65
See application file for complete search history.

(56) References Cited

U.S. PATENT DOCUMENTS

| | | | | |
|---|---|---|---|---|
| 4,034,210 A | * | 7/1977 | Hill et al. | 53/284.3 |
| 5,163,271 A | * | 11/1992 | Pan et al. | 53/254 |
| 5,285,620 A | * | 2/1994 | Kaye et al. | 53/254 |
| 5,388,815 A | * | 2/1995 | Hill et al. | 53/460 |
| 5,664,405 A | * | 9/1997 | Perego | 53/457 |
| 5,950,401 A | * | 9/1999 | Blohm et al. | 53/254 |
| 6,694,219 B2 | * | 2/2004 | Graushar et al. | 53/411 |
| 6,715,268 B2 | * | 4/2004 | Hill et al. | 53/284.3 |
| 7,328,551 B1 | * | 2/2008 | Torres, Jr. | 53/461 |
| 2002/0129582 A1 | * | 9/2002 | Mann | 53/460 |
| 2003/0090049 A1 | * | 5/2003 | Hill et al. | 270/32 |
| 2007/0102495 A1 | * | 5/2007 | Asimakis et al. | 229/68.1 |
| 2007/0157569 A1 | * | 7/2007 | Sichera et al. | 53/254 |

* cited by examiner

*Primary Examiner* — Christopher Harmon
(74) *Attorney, Agent, or Firm* — Knobbe Martens Olson & Bear LLP

(57) ABSTRACT

A method for producing a ready-to-distribute distribution assembly comprising a data carrier in a single production line is disclosed. The method includes providing a foldable cover panel having a basin for receiving a data carrier, inserting a data carrier, folding the cover panel, sealing the cover panel, and printing identification information on the cover panel.

19 Claims, 3 Drawing Sheets

METHOD FOR PRODUCING A READY-TO-DISTRIBUTE DISTRIBUTION ASSEMBLY COMPRISING A DATA CARRIER

CROSS-REFERENCE TO RELATED APPLICATION

This application claims the benefit of priority to Swedish Patent Application No. 0800306-3, filed on Feb. 11, 2008. The disclosure of the above-referenced application is hereby expressly incorporated by reference in its entirety.

BACKGROUND OF THE INVENTION

1. Field of the Invention

The present invention is related to a method for producing a ready-to-distribute distribution assembly comprising a data carrier. The present invention is also related to a ready-to-distribute distribution assembly comprising an integrated basin for receiving a data carrier obtainable by the method according to the present invention.

2. Description of the Related Art

There exist various methods in the art for distribution of data carriers such as credit cards. Typically, the methods include steps of preparing the credit cards separately from forms to which the credit cards are eventually attached. Consequently, most of these methods include multiple printing presses—wherein one press prepares the credit cards, another press prepares the forms, and a third press combines the credit cards and the forms with an adhesive. Not only do these methods involve a complex array of presses, but they also result in many problems such as the forms sticking together as a result of ineffective placement of adhesives for instance.

Preparation of the credit cards and forms further involves the printing of identification information. This identification information, which includes such items as identification numbers, the name and address of card holder, and policy terms, may be printed on the identification cards themselves or on the forms to which they are attached. Based on the current methods, these steps result in various problems. For example, the edges of the cards often become raised from the forms as they are being fed into a printer provided for the printing of identification information. Not only does this occurrence result in damaged cards, but also the printer may become jammed and/or damaged, resulting in further problems and delays. Furthermore, if the adhesive used to attach the cards to the forms was placed on a surface area exceeding that of the cards, the forms often become stuck together causing further problems and damage to the printing process. Finally, printer flaws are common when the thickness of the cards does not equal that of the forms. If the card has been superimposed on the surface of a carrier sheet, a stacking problem is created in the feed tray of today's high-speed printers because a large number of these sheets when stacked have a tendency to fall over or create an uneven stack due to the uneven surface area of the cards.

Although there have been improvements made to the above-cited problems, disadvantages still exist with the current methods. U.S. Pat. No. 5,462,488 shows an example of such an improvement. Generally, the card assembly disclosed by McKillip consists of four layers: upper material, laminate, removable adhesive, and lower material. A die-cut extends from the upper material through the removable adhesive, defining the shape of the card. This assembly is an improvement over the prior art in that the cards are substantially co-planar with their surrounding border thereby reducing many of the problems associated with the printing and stacking of the card forms. However, the handling of card assembly is still problematic when it is fed into standard printers and business equipment because of its thickness, as well as its adhesive materials. For example, when going through high speed or high heat printers, a percentage of the cards will separate or peel from the forms.

Other types of card assemblies such as post cards including data carriers such as CDs are also known in the state of the art. One such postcard is disclosed in WO-A1-02/36355. This known postcard comprises three separate, equally rectangular boards glued together on top of each other. The middle board is provided with a circular aperture for receiving a CD of smaller diameter than the aperture. The lower board is provided with an elastic button which protrudes through the aperture at the centre thereof. When a CD is placed over the elastic button in the aperture, it is held in place by the elastic button. The upper board is glued on top of the middle board after a CD has been properly inserted whereby the CD is enclosed in the post card. The upper board has a printed surface. However, also this card assembly still posses printing problems similar to the described above.

There exists a need for an improved method for producing ready-to-distribute card assemblies that will avoid the problems faced by the current methods. The instant invention meets this need, and provides an improved integrated card and business form.

SUMMARY OF THE INVENTION

It is an object of the present invention to provide an improved method for producing a ready-to-distribute distribution assembly comprising a data carrier compared to the described prior art.

According to an aspect of the invention this is achieved by a method according to claim 1.

Herein, the term "ready-to-distribute distribution assembly" includes any kind of distribution vehicle comprising a data carrier or a ready-to-display assembly (for in stance for use in stores).

According to an embodiment of the invention, there is provided a method for producing a ready-to-distribute distribution assembly comprising a data carrier, including the following steps:
1) introducing a cover panel comprising a foldable basin forming part prepared for after folding receiving a data carrier of a production line so that the data carrier can be inserted into a basin of the cover panel;
2) arranging the data carrier in the folded basin part such that it remains in place;
3) identifying the data carrier;
4) matching the identified data carrier with identification data;
5) sealing the cover panel to provide a ready-to-distribute distribution assembly;
6) printing the identification data directly on a printing surface of the ready-to-distribute distribution assembly.

The method further comprises the steps of:
7) if for any reason the data is unreadable, the card is rejected and the line is stopped
8) securing (double-checking) that all that goes in comes out in a sequential order.

In this way, a fully automated process having less logistics and higher output in speed is provided.

The steps are performed in consecutive order following the numbering from 1-8.

Typically, before the first step 1), the cover panel is prepared such as prefolded, perforated and die-cutted.

Typically, before arranging the data carrier, the step of:
 gluing a first prefolded cover panel part and folding the same once is performed.

Typically, after having arranged the data carrier, the step of:
 gluing a second prefolded cover panel part and folding the same once is performed.

Typically, the identification of the data carrier is provided by an identification means selected from: optical reader, RFID, microscope lens or magnetic stripe reader.

The expression "ready-to-distribute distribution assembly" further includes, for example, postcards, greeting cards, tickets, menus and advertisements.

The expression "data carrier" includes, for example, a disc shaped storage means such as a CD, DVD, CD-ROM; a Smart card such as credit card, debit card or a SIM-card etc. and a USB stick.

The cover panel is made from a blank of suitable material such as paper, cardboard or plastic. According to an embodiment, the thickness of the cover panel material is adapted to the thickness of the data carrier, in particular to facilitate the "basin" for the data carrier in order to secure it's placement for high speed production. In this way, the ready-to-distribute assemblies are stackable and provided for sorting in a machine. This is, according to our best knowledge, not known from prior art.

The present invention is also related to a ready-to-distribute distribution assembly comprising an integrated basin for receiving a data carrier obtainable by the method according to the present invention.

These, other features and their advantages will be apparent to those skilled in the art of manufacturing card and business form assemblies from a careful reading of the Detailed Description of Preferred Embodiments, accompanied by the following drawings.

The summary is intended to present a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

DETAILED DESCRIPTION OF THE INVENTION

Although the distribution assembly for a data carrier and method for producing same will be described herein with respect to a card, those skilled in the disc manufacturing arts or telecommunications service providers will readily appreciate the adaptability of the present invention also to other types of data carriers, and in particular to disc such as CDs, DVDs, and SMART cards such as credit cards and SIM (Subscriber Identification Module) cards.

Figure 1A:
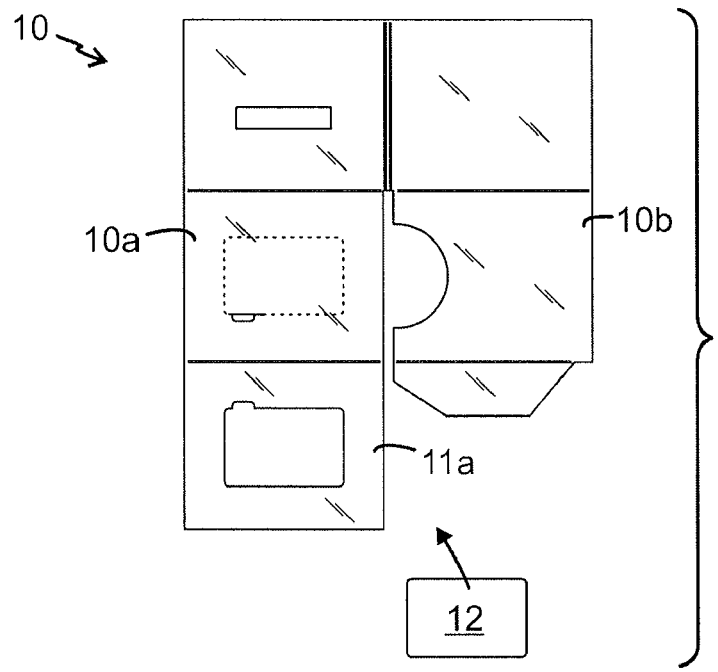
FIG. 1a is a plan view of an unfolded distribution assembly for a printable data carrier; with basin part unfolded.
Figure 1B:
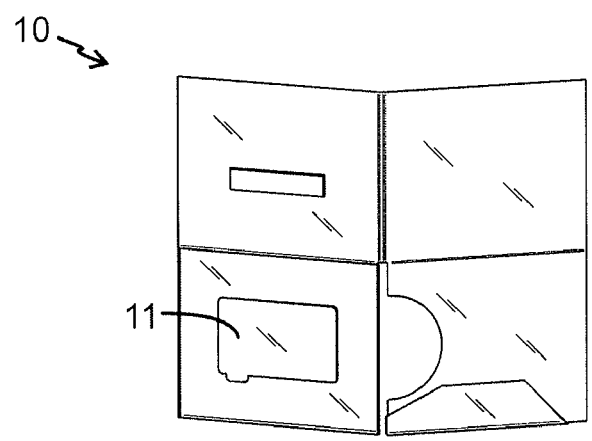
FIG. 1b is a front view of the same distribution assembly as illustrated in FIG. 1a, but illustrated in a folded position (basin part folded such that the basin is formed), wherein the blind panel, after having received a data carrier (not shown)

Referring now to FIG. 1a-d, a distribution assembly 10 for a data carrier is shown. FIG. 1a is a plan view of an unfolded distribution assembly 10 for a data carrier 12 (not shown in all figures). In FIG. 1a, the distribution assembly 10 is shown with unfolded basin forming part 11a. In FIG. 1b the basin forming part 11a is shown folded such that a basin 11 is provided.

Figure 1C:
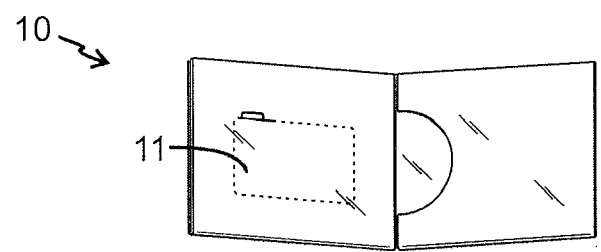
FIG. 1c is a perspective view of the same distribution assembly as illustrated in FIGS. 1a and 1b but almost folded.

FIG. 1c is a perspective view of the same distribution assembly 10 as illustrated in FIGS. 1a and 1b but almost folded.

The distribution assembly is generally indicated by reference number 10. The front and rear views of distribution assembly 10 are illustrated in FIGS. 1b and 1d, respectively.

Figure 1D:
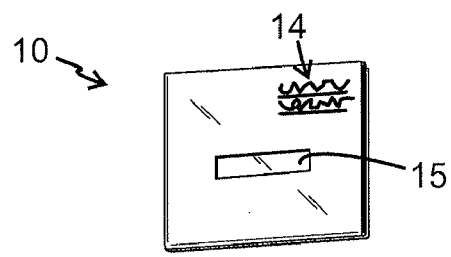
FIG. 1d is a rear view of the same distribution assembly as illustrated in FIG. 1a-c, but in a sealing folded position providing a ready-to-distribute distribution assembly having printed identification data on the printing surface of the distribution assembly.

As shown in FIG. 1d, which is a rear view of the same distribution assembly 10 as illustrated in FIG. 1a-b, but in a sealing folded position providing a ready-to-distribute distribution assembly 10 having identification data 14 that are printed onto the same 10. It is not necessary to show visible identification data, such as is typically the case for instance for SIM cards, but in some cases, for instance as regards banking cards, it might even be preferred not to show visible readable data or that a data carrier is even present, for instance provided by a window 15. Some kind of coded data might instead be present. All kinds of printable identification data including conventional codes such as EAN codes, bar codes etc could be printed as identification data 14.

Figure 2:
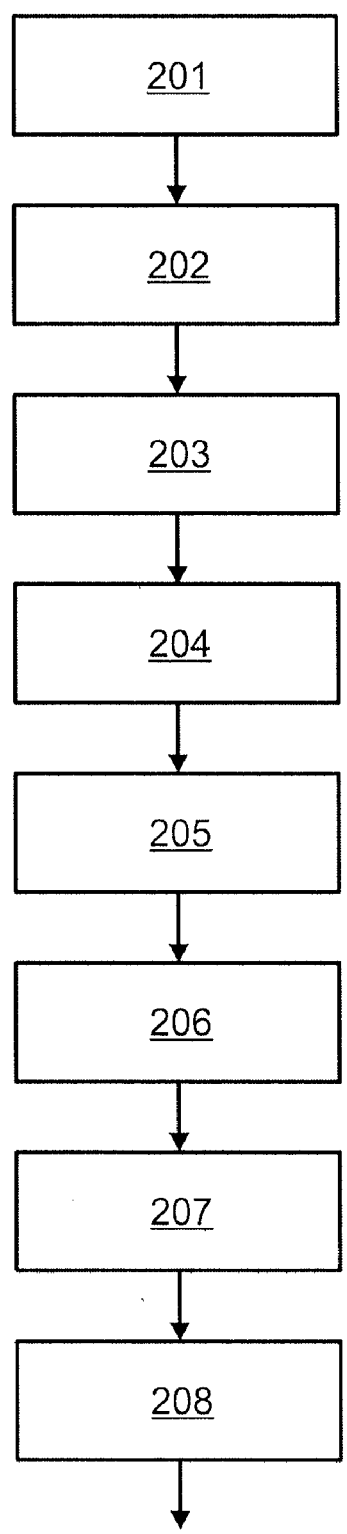
FIG. 2 is a schematic diagram illustrating a method of producing a distribution assembly according to a preferred method of the present invention.
Figure 3A:
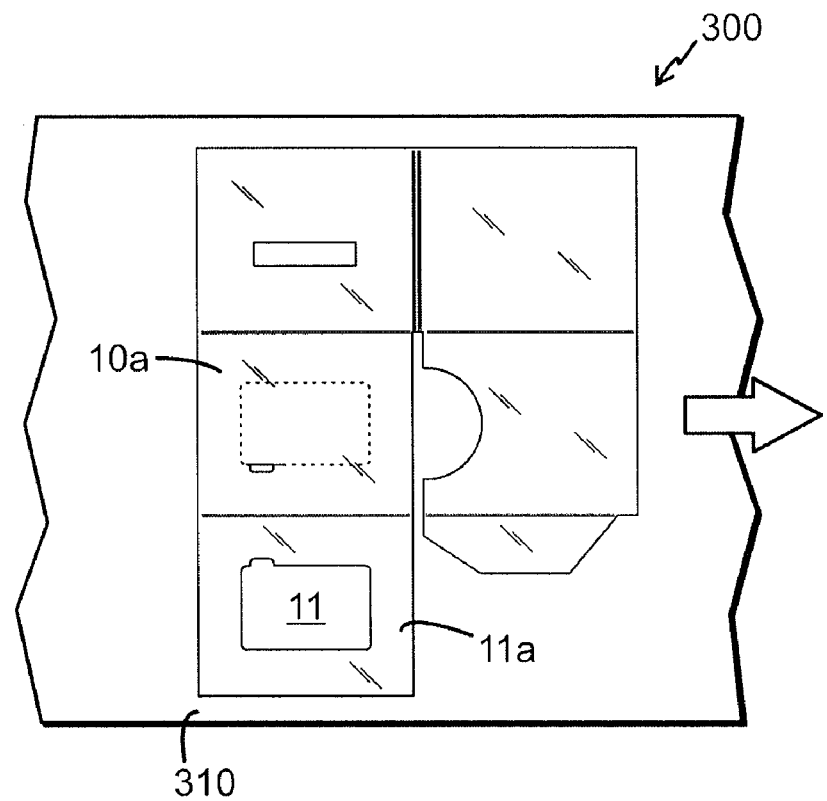
FIG. 3a-b is a production line for performing the method illustrated in FIG. 2.
Figure 3B:
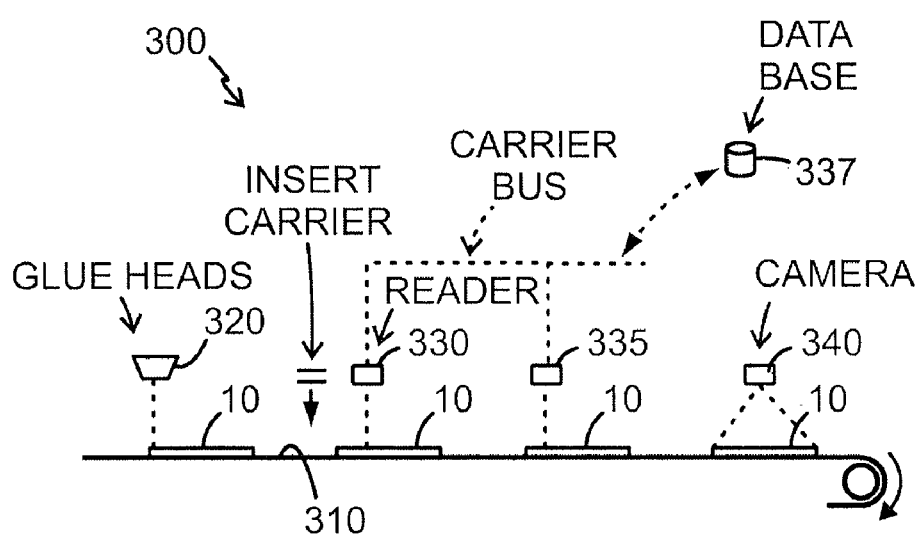

An embodiment of the invention will now be described in more detail with reference to FIG. 1a-d, FIG. 2, which is a block schematic illustrating a method of producing a ready-to-distribute distribution assembly for a data carrier and FIG. 3a-b, which is a production line for performing the method illustrated in FIG. 2. FIG. 3a is a perspective view from above of the production line 300 and FIG. 3b is a cross-sectional view of the same production line 300. Only one distribution assembly 10 is illustrated and described for a better understanding of the invention, but in practice a large number of assemblies are provided. Typically, the method and production line operate at high speed and all is fully automated. This is one of the key points of the invention, i.e. to be able to insert a data carrier into a distribution vehicle, identify it and match it toward data files, print the corresponding recipient's data directly onto the distribution assembly; secure that each step has successfully been performed in one production line is the key to industrialization.

In a first step, step 201, an empty (empty of data carrier) distribution assembly in the form of a cover panel 10a prepared for receiving a data carrier 12 (data carrier shown outside the cover panel 10a) is introduced into a production line 300 having a rotating transport belt 310 such that the data carrier 12 can be inserted into a basin 11 of the cover panel 10a. Note that the basin 11 is an integrated part of the cover panel 10a and not a separate panel. An arrow shows the machine direction of the production line 300.

The cover panel 10a is made from a blank of suitable material such as paper, cardboard or plastic. In this particular example, the cover panel 10a in the form of a cardboard is introduced such that it lies flat on a transport belt 310 of the device 300. The cardboard is pre-folded, pre-creased, perforated and has a foldable basin forming element 11a comprising a die-cutted basin 11. The die-cutted basin 11 illustrated in this figure is suitable for a data carrier in the form of a card, but of course the shape of the die-cutted basin could be adapted to any type of data carrier. According to our best knowledge, prior art cover panels do not present any (integrated) basin elements. According to the invention, the basin 11 will be non-visible when the cover panel 10a is folded and sealed.

According to an embodiment of the present invention, the thickness of the cover panel material is adapted to the thickness of the data carrier to provide higher machine speed. The thickness of the panel that matches the thickness of the data carrier is key to level the over-all thickness of the "distribution assembly" in order to avoid bulkiness at the position the data carrier has. If bulkiness would appear the "distribution assembly" wouldn't be stackable and postage favor wouldn't apply.

Typically, the cover panel 10a with the die-cutted basin 11 is glued by glue strings (for instance five) by laser guided glue heads 320. However, the invention is by no means limited to this, also other types of adhesives and equipment could be provided instead.

In a next step, step 202, the data carrier 12 is being arranged to the basin 11 such that it remains in place. Typically, the data carriers are located in a stack from which one after one is released and placed in the basins 11 of the cover panels 10a. According to another embodiment of the present invention, more than one data carrier 12 could be inserted.

For instance, the data carrier, herein media in the form of a card or a CD or DVD disc gets an electric charge of static electricity in order to get the disc to stick to the cover panel 10a for a short period of time such as parts of a second, a hydraulic suction cap picks up the card or CD or DVD disc and places the carrier into the die-cutted basin.

Thereafter, in a following step, step 203, the data carrier 12 is identified and matched, step 204, with distribution data (typically stored in a data base 337 communicating with or part of the distribution line 300 for instance by means of a data bus). For instance, the data carrier 12 gets identified by an optical reader 330, RFID, microscope lens or fingerprint technology magnetic stripe reader and matched with data that is stored in the data base 337 communicating via the data bus also connected to a printer such as an ink-jet printer and remains memorized.

Then, in a next step, step 205, the cover panel 10a is sealed to provide a ready-to-distribute distribution assembly 10. For instance, laser guided glue heads (not shown) plotters glue onto the surface of the cover panel 10a and a second prefolded cardboard panel part 10b is folded into the centre.

Then, in a next step, step 206, identification data 14 is printed by means of a printer 335 directly on the printing surface of the distribution assembly; step 206. The matching in-data gets printed directly onto the sealed distribution assembly 10 (See FIG. 1d) in the sealed distribution assembly 10.

Typically, at the end of the line a camera 340 counts in a sequential order to double check that everything that have been provided have gone through the whole line as intended. If the camera 340 recognises a missing part it immediately stops the line, step 207, 208. Typically also the camera 340 is linked to the data base, for instance by means of the data bus or the like.

In yet another embodiment of the present invention it is possible to add another insertion table for a second unit such as a data carrier, USB device, folder etc. to be inserted and an extra station for shrink wrapping or tabbing if requested.

It will be apparent to those skilled in the arts that many changes and substitutions can be made to the foregoing preferred embodiment and method without departing from the spirit and scope of the invention, which is defined by the appended claims.

What is claimed is:

1. A method of producing a ready-to-distribute distribution assembly comprising a data carrier, the method comprising:
    providing a cover panel comprising a foldable basin, the basin configured to receive a data carrier therein;
    inserting the data carrier into the basin;
    identifying the data carrier;
    matching the identified data carrier with identification data;
    sealing the cover panel, wherein a ready-to-distribute distribution assembly is formed; and
    printing the identification data on the ready-to-distribute distribution assembly, wherein a first part of the cover panel is glued and folded before placing the data carrier.

2. The method according to claim 1, further comprising testing the printed identification data.

3. The method according to claim 2, further comprising rejecting the data carrier if the printed identification data fails the testing.

4. The method according to claim 2, further comprising stopping a production line if the printed identification data fails the testing.

5. The method according to claim 1, further comprising repeating the providing, identifying, matching, sealing, and printing steps to generate a plurality of printed ready-to-distribute distribution assemblies.

6. The method according to claim 5, further comprising verifying that the sequence of assemblies that is generated corresponds to the sequence of identified data carriers.

7. The method according to claim 1, wherein the cover panel is at least prefolded, perforated, or die-cut.

8. The method according to claim 1, further comprising gluing and folding a second part of the cover panel after placing the data carrier.

9. The method according to claim 1, wherein the data carrier is identified using at least an optical reader, an RFID reader, a microscope, or a fingerprint reader.

10. The method according to claim 1, further comprising inserting another device into the cover panel.

11. The method according to claim 10, wherein the other device comprises a data carrier.

12. The method according to claim 10, wherein the other device comprises a USB device.

13. The method according to claim 10, wherein the other device comprises a folder.

14. The method according to claim 10, wherein the other device comprises a user manual.

15. The method according to claim 1, further comprising sealing the assembly.

16. The method according to claim 15, wherein sealing the assembly comprises shrink wrapping the assembly.

17. The method according to claim 15, wherein sealing the assembly comprises placing a tab on the assembly.

18. A method of producing a ready-to-distribute distribution assembly comprising a data carrier, the method comprising:
    providing a cover panel comprising a foldable basin, the basin configured to receive a data carrier therein;
    inserting the data carrier into the basin;
    charging the data carrier with static electricity;
    identifying the data carrier;
    matching the identified data carrier with identification data;

sealing the cover panel, wherein a ready-to-distribute distribution assembly is formed; and printing the identification data on the ready-to-distribute distribution assembly, wherein a first part of the cover panel is glued and folded before placing the data carrier.

19. The method of claim 18, further comprising gluing and folding a second part of the cover panel after placing the data carrier.

* * * * *